United States Patent [19]

Peek et al.

[11] Patent Number: 4,986,024

[45] Date of Patent: Jan. 22, 1991

[54] INSECT TRAP

[75] Inventors: Thomas W. Peek; John B. Floyd, both of Ocala, Fla.

[73] Assignee: Bio-AgriTech, Inc., Jacksonville, Fla.

[21] Appl. No.: 424,151

[22] Filed: Oct. 19, 1989

[51] Int. Cl.⁵ .............................................. A01M 1/20
[52] U.S. Cl. ...................................... 43/107; 43/122
[58] Field of Search ................................. 43/107, 122

[56] References Cited

U.S. PATENT DOCUMENTS

| | | | |
|---|---|---|---|
| 1,534,771 | 4/1925 | Cvengros | 43/107 |
| 1,634,648 | 3/1926 | Cardinet | 43/107 |
| 1,783,631 | 2/1930 | Sladky | 43/107 |
| 1,996,293 | 8/1933 | House | 43/107 |
| 4,411,093 | 10/1983 | Stout et al. | 43/114 |
| 4,571,880 | 2/1986 | Hayward | 43/122 |
| 4,577,434 | 3/1986 | Davis | 43/114 |
| 4,671,010 | 7/1987 | Conlee | 43/114 |
| 4,694,604 | 9/1987 | Mitchell | 43/122 |

FOREIGN PATENT DOCUMENTS

| | | | |
|---|---|---|---|
| 102564 | 12/1937 | Australia | 43/107 |
| 2412723 | 9/1975 | Fed. Rep. of Germany | 43/107 |
| 1137978 | 12/1955 | France | 43/107 |
| 85185 | 3/1955 | Norway | 43/122 |

Primary Examiner—Richard K. Seidel
Assistant Examiner—Rex E. Pelto
Attorney, Agent, or Firm—Thomas C. Saitta

[57] ABSTRACT

An insect trap utilizing an attractant to attract flies to the device and a poison to kill the flies. The trap has an outer housing open on its upper and lower ends, and a cap which fits onto the upper end of the housing. The cap has a central aperture and a vent tube which extends upwardly. The vent tube is surrounded by a vent screen. A receptacle containing the attractant fits into a receiving member on the underside of the cap, where the only means of exit for the attractant is through the vent tube. A poison sleeve surrounds the receptacle and is coated with the poison. The sleeve rests in a seat formed at the bottom of the receptacle. The receptacle is separable from the cap, and the cap is separable from the housing for replinishment of the attractant or replacement of the poison sleeve. The housing has a bracket for attaching the device to a building. Decoy flies made of yarn may be attached to the outside of the housing.

12 Claims, 1 Drawing Sheet

INSECT TRAP

BACKGROUND OF THE INVENTION

This invention relates generally to the field of insect traps, and more specifically to the field of insects traps having attractant means and pesticide means for attracting and killing flies.

Flies of all types are an annoyance, carrying and spreading harmful diseases. Flies are bothersome to humans, but the problems caused by flies are much more serious to animals. In the field of raising or keeping horses, for example, flies pose a tremendous potential for harm. The diseases and parasites spread by flies can be seriously damaging or even fatal to horses. Since horses represent a serious investment, and often an astronomical one is the case of race horses or rare breeds, it is important to develop means to safely eradicate flies in the equine environment. It is desirable to do so without having to resort to massive spraying of pesticides in the animal's living environment.

The problems are most acute in barns or stables, for the obvious reason that such a building represents a prime concentration of natural attractants for the insect. In attempting to solve the fly problem in such structures, several devices have been developed which attempt to overcome the drawbacks presented by indiscriminate use of pesticides. These devices involve housings which contain attractants to draw the flies, as well as pesticides to eradicate the flies.

For example, U.S. Pat. No. 3,708,908 to Levey teaches a trap having an attractant placed within a perforated tube, this tube being coated on the outside with a sticky substance. A perforated outer tube acts as a housing, the perforations allowing flies access to the inner tube, where they become stuck in the sticky substance and eventually die.

Another example is U.S. Pat. No. 4,802,303 to Floyd, one of the co-inventors of the present invention. That device has an outer tube, closed at the top, with large apertures around the body of the tube. An inner tube having perforations near its top and middle is a reservoir for an attractant. Surrounding the inner tube is a sleeve coated with a pesticide. The bottom of the inner tube is formed such that the sleeve rests in a retaining member which is apertured, as is the sleeve, to allow air to flow under the bottom and into the sleeve, then into the interior of the inner tube through the middle perforations, out the upper perforations, out the top of the sleeve and down from the closed housing to exit through the apertures in the body of the outer tube. The device works to disperse the attractant by this chimney draft effect.

These devices suffer deficiencies due to their design. The Levey device does not actively diffuse the essence of the attractant but relies simply on the natural evaporation factors to spread it in the vicinity of the trap. The sticky substance loses its ability to hold flies after a short period of time. The trap is not reusable but must be completely replaced. The Floyd device, while being a dramatic improvement over the Levey type device, also has several drawbacks. The closed cap creates a circumstance where moisture from humidity, rain, cleaning hoses etc. becomes trapped in the housing, causing the material of the sleeve to deteriorate and affecting the efficiency of the pesticide. The chimney effect method of dispersion for the essence of the attractant is not the optimum method to disperse the essence, and allows the attractant in the reservoir to totally evaporate in too short a time period. The attractant often leaks into the bottom retaining member, which tends to draw the flies to this location and away from the poison on the sleeve. It has actually been shown that the device can become a breeding place due to this defect. Furthermore, replacing the attractant or the pesticide sleeve requires unscrewing the internal components from the housing, which means that the device must be placed high enough to allow room under it to remove the components. This is a drawback since flies prefer to feed on or near ground level, this being where they find their food in the natural environment. Rethreading the internal components during replacement requires careful attention and is needlessly messy.

The present invention overcomes the problems outlined above by providing a fly trap not requiring working mechanical or electrical components, the design of which provides the optimum method of attractant dispersal while at the same time conserves the total amount of attractant. The device has a substantially enclosed housing which isolates the pesticide within the device and away from unnecessary human or animal contact. Replacing the attractant or the pesticide sleeve is easily accomplished from the top of the device. The problems of moisture build-up and resulting sleeve deterioration, as well as accumulation of attractant in undesirable locations on the device, are eliminated.

SUMMARY OF THE INVENTION

The invention comprises a main housing, open on both ends and adapted to be mounted onto any desired structural component of a barn or other building. The housing has several small apertures near its top which allow moisture to escape and light to enter the interior. A removable cap member fits tightly on the top of the housing. The cap has a receptacle receiving member on its interior which receives the upper end of the receptacle member by friction fit. The receptacle member is a tube several inches longer than the housing and extends beyond the open bottom end of the housing. This receptacle member is closed at the bottom end and the only opening is at the top end, the receptacle member being the container for the attractant. The bottom of the receptacle member is larger in circumference than the main body of the receptacle member and has a flange adapted to hold the pesticide sleeve, which is large enough in inner diameter to slip easily over the main body of the receptacle member. The sleeve has a pesticide or poison adhered to its outer surface. The top of the receptacle member fits firmly into the receptacle receiving member of the cap, maintaining both the receptacle member itself and the pesticide sleeve within the housing. The cap has a small central aperture connecting the interior of the receptacle member to a venting tube and screened vent enclosure extending from the top of the cap. As an optional feature, decoy flies may be attached to the outside of the housing.

To ready the device for use, the cap is removed from the housing. The receptacle member is then separated from the receptacle receiving member of the cap by twisting or pulling. An insect attractant is placed inside the receptacle member. The pesticide sleeve is placed around the receptacle member and rests in the seat created by the flanged bottom. The receptacle member is then force fit back into the receptacle receiving member of the cap, and the cap is placed back onto the housing. In this manner, the attractant is dispersed through only one opening, the aperture extending through the cap. The venting tube creates a jug effect, much the same as blowing across an empty bottle, so that ambient air currents will draw out and disperse the attractant for a wide range of effectiveness. The flies are attracted to the device, where they enter the housing through the open bottom or the moisture apertures, alight on the pesticide sleeve and eat the poison.

DETAILED DESCRIPTION OF THE INVENTION

Figure 1:
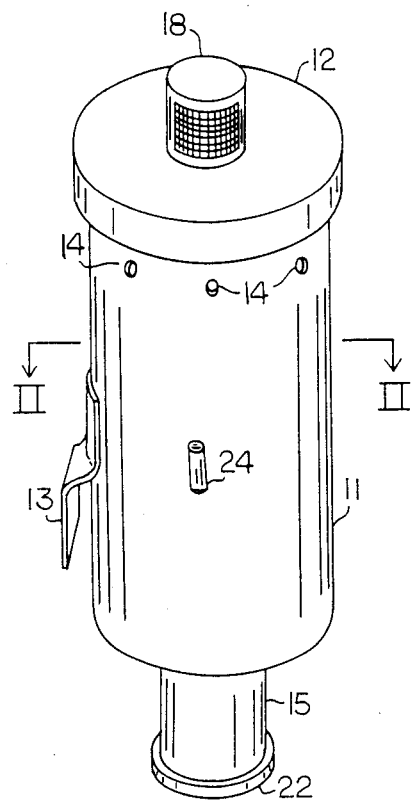
FIG. 1 is an external view of the device.
Figure 2:
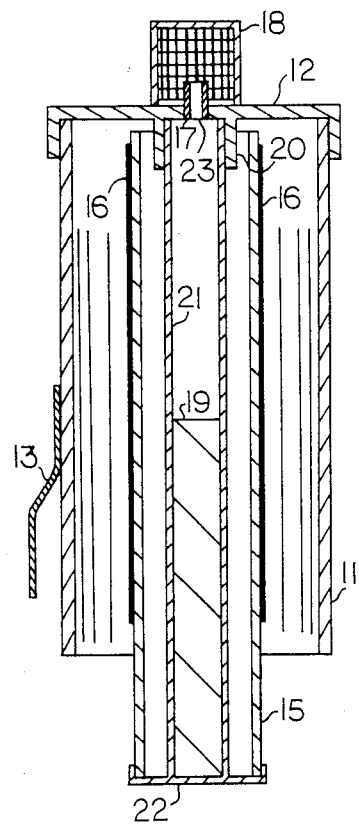
FIG. 2 is a cross-sectional view of the device taken along line II-II of FIG. 1.

The invention is an insect trap utilizing an attractant and a poison to attract and kill flies. With reference to the figures, it is seen that the invention comprises a housing 11, preferably tubular, having a cap 12. Housing 11 is open at both ends, and is preferably approximately 12 inches in length and 4 inches in diameter. Cap 12 is a lipped closure member whose interior dimension is sized only slightly larger in diameter than housing 11 so a to form a tight friction fit with housing 11 when it is placed on the upper end of the housing 11. Cap 12 is removable from and replaceable on housing 11 by hand.

A bracket member 13 is attached to the exterior of housing 11 by any suitable fastening means. Bracket 13 is used to affix the device to a structural member of a building where the device is to be located. The device is positioned such that the main axis of housing 11 runs vertically, so that one open end of housing 11 is the upper end and the other open end is the bottom, and should be positioned near the ground for optimum effect.

Moisture apertures 14 are located at positions around the upper portion of housing 11, but below the lip of cap 12 when it is in place. The moisture apertures 14 accomplish three purposes, the main purpose being to allow any moisture which gets into the interior of housing 11 because of humidity, rain, hoses, etc. to quickly evaporate without saturating the pesticide sleeve 15. The effective life of the pesticide sleeve 15 and the poison 16 is greatly reduced by moisture build-up, so the moisture apertures 14 prevent this occurrence. Also, moisture apertures 14 allow light to enter the interior of the housing 11. It is known that flies will avoid dark, confined areas, since they cannot be alert for potential dangers. The moisture apertures 14 alleviate this problem and thereby increase the effectiveness of the device. Finally, the moisture apertures provide additional means of entry for the fly to get inside housing 11 and obtain the poison 16. Preferably, the moisture apertures 14 are cut so as to have an outwardly sloping lower lip to facilitate moisture drainage to the outside of the housing 11.

Centrally located in cap 12 is vent aperture 23. Vent aperture 23 is a small opening extending completely through cap 12 and is preferably located on the central axis. Vent tube 17 extends a short distance, preferably about one half inch, above the top of vent aperture 23 and cap 12. Surrounding vent tube 17 is vent screen 18. Vent screen 18 completely encloses and surrounds vent tube 17 but allows air to flow freely through and across the top of vent tube 17. Vent screen 18 can be made of typical screening material or any type of finely perforated material that will allow free air flow but will prevent insects, dirt and debris from access to vent tube 17 and vent aperture 23. In this manner air currents can pass through vent screen 18 and pass over vent tube 17, thereby drawing out the attractant 19 by creating a slight suction effect and dispersing it throughout the vicinity of the device.

On the underside of cap 12, receptacle receiving member 20 is a short wall or shoulder extending from cap 12. Receptacle receiving member 20 acts as a fitting to receive and retain the upper end of receptacle member 21. Receptacle member 21 is retained within receptacle receiving member 20 by a friction fit. The connection between receptacle receiving member 20 and receptacle member 21 forms an airtight seal, so that no attractant 19 escapes to the interior of the housing 11, the only opening to the atmosphere being through vent tube 17.

Receptacle member 21 is a long, relatively thin container open on the upper end and completely sealed on its bottom end. Preferably tubular, any cross-sectional configuration may be used provided that receptacle receiving member 20 is adapted to receive it. Receptacle member 21 is the container which holds the attractant 19. The attractant 19 can be of any known type, such as the type made from naturally existing decaying organic matter or any of the synthetic compositions known in the art. The attractant 19 is preferably in liquid form, so that the rate of dispersal is maximized and relatively uniform over time. It is also been found to be preferable to place a plastic or rubber foam material inside receptacle member 21 to provide a matrix to contain the attractant. It has been found that the use of a foam, as opposed to felt or other materials, extends the useful life of the device. Receptacle member 21 should be several inches longer than housing 11, so that it extends through and beyond the open end of housing 11. Preferably, receptacle member 21 is a tube approximately 14 inches in length and 1 inch in diameter. The open end of receptacle member 21 is fitted into receptacle receiving member 20 of cap 12. The only escape for the attractant 19 is through vent aperture 23 and vent tube 17 into the atmosphere.

The bottom of receptacle member 21 is larger in circumference than the main body portion of the receptacle member 21 and is flanged to create a seat 22 for sleeve 15. The flanges of seat 22 are of sufficient length to maintain sleeve 15 in place, but are preferably short in height to prevent retention of moisture. The flanges are sized to fit snugly around sleeve 15 to prevent collection of debris, dead flies, etc.

Pesticide sleeve 15 is a hollow tube which is coated on its exterior with a pesticide or poison 16 deadly to flies. Preferably, the poison 16 is a mixture of sugar or any other food source and any of the known pesticides, such as DDVP. Poison 16 may be affixed by adhesive to the exterior of sleeve 15. Preferably, sleeve 15 is made from cardboard stock, as this provides a low cost carrier and a good surface for adhesion. Sleeve 15 is approximately the lame length or slightly shorter than the length of receptacle member 21. It is also preferable that the bottom portion of sleeve 15 be kept clean of the poison 16 for several inches. This insures that all the poison 16 will be contained within housing 11, accessible to flies but not to animals or humans.

As additional inducement to draw the flies to the device, artificial fly decoys 24 can be attached to the outside of housing 11. It is known that flies are social insects and it has been found that the use of these decoys 24 increases the effectiveness of the device in attracting flies. Preferably, the decoys 24 are made of short bits of yarn, knotted on one end to resemble a head. It has been discovered that colors such as red, black or dark gray are the most effective. Furthermore, yarn having silvery threads intermingled with the main color show improved ability to attract flies, perhaps because the silvery, reflective threads appear as wings to the flies. The decoys 24 can be attached by adhesive or any other suitable fastening method.

With the device attached by bracket 13 in the desired location in a barn or stable, the user can easily recharge the device after its effectiveness diminishes. It is preferable to keep devices of this type low so as to be out of the way and less accessible to the horses, as well as to take advantage of the natural inclination of flies to feed at or near ground level. This is true since the primary sources of naturally occurring food sources are on the ground. To activate the device or replace spent components, the user simply removes the cap 12 by pulling or twisting it off of housing 11. Housing 11 remains affixed to the building, while the remainder of the components are lifted up from the housing 11. Receptacle member 21 is then separated from cap 12 by pulling or twisting it from receptacle receiving member 20. The attractant 19 can now be easily poured into the interior of receptacle member 21, or an expended pesticide sleeve 15 can be slid from receptacle member 21, to be replaced by a new sleeve 15 or recharged by having new poison 16 adhered to it. With the new sleeve 15 in place and the attractant 19 refilled, the user simply inserts the open end of receptacle member 21 into receptacle receiving member 20, forming a friction fit with cap 12. Cap 12 is then lowered back onto housing 11 and pressed down to form a secure connection. Because the operation is performed from above, accidental spillage or contact with the attractant 19 or the poison 16 is avoided.

With the device in place, the attractant 19 slowly diffuses into the empty portion of the interior of receptacle member 21 and out through vent tube 17. Because vent tube 17 is a narrow passage and extends above the surface of cap 12, air currents passing through vent screen 18 will create a suction effect to draw out the attractant 19 and disperse it into the surrounding atmosphere. Since the vent tube 17 has a small opening relative to the internal capacity of receptacle member 21, the air contained within the receptacle member 21 will be heavily saturated with attractant 19. It is this saturated air which is drawn from vent tube 17, and this optimizes the effective dispersal of the attractant 19 throughout the area. It has been found that this method of dispersal is much more effective than prior methods, such as use of a chimney effect or merely allowing the attractant 19 to evaporate at its own rate. The flies sense the attractant 19 and locate its source, flying to and alighting on the housing 11. They then enter through the large open end of the housing 11 or crawl through moisture apertures 14 to reach the sugar and poison 16 combination. Upon eating the poison 16, the flies drop off to the ground for easy removal.

It will be obvious to those skilled in the art that equivalents and substitutions will exist with regard to the above disclosure. The discussion and drawings are by way of illustration only and are not meant to limit the invention in any way. The true definition and scope of the invention is to be as set forth in the following claims.

We claim:

1. An insect trap using an attractant means to attract the insects and a poison means to kill the insects comprising:
   (A) a housing having an open upper end and an open bottom end;
   (B) a removable cap member adapted to fit onto said open upper end of said housing, said cap member having a relatively small aperture, a vent tube extending upwardly from said aperture, a vent screen enclosing said vent tube, and a receptacle receiving member;
   (C) attractant means which diffuses into the surrounding atmosphere for attracting insects and poison means for killing insects;
   (D) a receptacle member for holding said attractant means having an open upper end adapted to be attached to said receptacle receiving member, a closed relatively long main body and a closed bottom end having a flanged seat for retaining a poison sleeve;
   (E) a poison sleeve surrounding the main body of said receptacle member and retained within said flanged seat, where said poison means is attached to the exterior of said poison sleeve;
   (F) where said receptacle receiving member closes said open end of said receptacle member and said vent tube is the only exit means for said attractant means to diffuse from said receptacle member into the atmosphere.

2. The device of claim 1, where said housing and said receptacle member are tubular.

3. The device of claim 1, where the attachment between said receptacle member and said receptacle receiving member is a friction fit.

4. The device of claim 1, where said receptacle member is longer than said housing.

5. The device of claim 1, where said poison sleeve is made of cardboard.

6. The device of claim 1, where said housing has several moisture apertures located near its upper end.

7. The device of claim 1, where said poison means is not attached to the lower portion of the exterior of said poison sleeve.

8. The device of claim 1, further comprising a foam material contained within said receptacle member to receive said attractant means.

9. The device of claim 1, further comprising a bracket member attached to the exterior of said housing.

10. The device of claim 1, further comprising artificial fly decoys attached to the exterior of said housing.

11. The device of claim 10, where said decoys are made of yarn.

12. The device of claim 1, where said housing is approximately 12 inches in length and 4 inches in diameter, and said receptacle member is approximately 14 inches in length and 1 inch in diameter.

* * * * *